United States Patent
Herron et al.

(10) Patent No.: US 11,163,807 B2
(45) Date of Patent: Nov. 2, 2021

(54) SYSTEM FOR DATA STRUCTURE CLUSTERING BASED ON VARIATION IN DATA ATTRIBUTE PERFORMANCE

(71) Applicant: Premier Healthcare Solutions, Inc., Charlotte, NC (US)

(72) Inventors: Michael Herron, Charlotte, NC (US); Michael Long, Charlotte, NC (US)

(73) Assignee: Premier Healthcare Solutions, Inc., Charlotte, NC (US)

( * ) Notice: Subject to any disclaimer, the term of this patent is extended or adjusted under 35 U.S.C. 154(b) by 165 days.

(21) Appl. No.: 16/432,110

(22) Filed: Jun. 5, 2019

(65) Prior Publication Data

US 2020/0387526 A1    Dec. 10, 2020

(51) Int. Cl.
G06F 17/00 (2019.01)
G06F 7/00 (2006.01)
G06F 16/28 (2019.01)
G06F 16/2457 (2019.01)

(52) U.S. Cl.
CPC ........ G06F 16/288 (2019.01); G06F 16/2457 (2019.01); G06F 16/285 (2019.01)

(58) Field of Classification Search
CPC .. G06F 16/288; G06F 16/2457; G06F 16/285; G06F 16/287; G06F 16/358
See application file for complete search history.

(56) References Cited

U.S. PATENT DOCUMENTS

| | | | | |
|---|---|---|---|---|
| 7,007,023 B2* | 2/2006 | Huynh | ............ | G06F 16/283 |
| 7,127,383 B2* | 10/2006 | Ascenzi | ............ | G09B 23/30 |
| | | | | 703/11 |
| 7,155,427 B1* | 12/2006 | Prothia | ............ | G06F 16/284 |
| | | | | 707/694 |
| 8,639,547 B1* | 1/2014 | Judy | ............ | G06Q 10/105 |
| | | | | 705/7.11 |
| 9,262,469 B1* | 2/2016 | Taylor | ............ | G06F 16/248 |
| 2004/0044685 A1* | 3/2004 | Huynh | ............ | G06F 16/283 |
| 2006/0167947 A1* | 7/2006 | Dunkle | ............ | G05B 19/4183 |

(Continued)

OTHER PUBLICATIONS

Byrne, M., C. Daw, H. Nelson, T. Urech, K. Pietz and L. Petersen. (2009). Method to Develop Health Care Peer Groups for Quality and Financial Comparisons Across Hospitals. Health Services Research, 44(2P1), 577-592.

(Continued)

*Primary Examiner* — Pavan Mamillapalli

(74) *Attorney, Agent, or Firm* — Moore & Van Allen PLLC; W. Kevin Ransom

(57) ABSTRACT

The invention provides a comprehensive system, method and computer program product for data structure clustering based on variation in data attribute performance. In general, the invention is configured to link a sub-set of data structures out of a global set of data structures based on identifying stimulus type attributes that are structured to produce a functional performance parameter of the associated data structure, particularly in the field of hospital data analysis. Typically, the invention is configured to receive a request for construction of a peer data cluster for a first functional performance parameter of the first entity data structure. The invention may then determine at least one second entity data structure of a plurality of entity data structures that is a peer entity data structure, and linking the first entity data structure and the second entity data structure to form the peer data cluster.

26 Claims, 9 Drawing Sheets

(56) References Cited

U.S. PATENT DOCUMENTS

| | | | | |
|---|---|---|---|---|
| 2010/0274580 A1* | 10/2010 | Crownover | G06Q 10/06 |
| | | | 705/2 |
| 2016/0132811 A1* | 5/2016 | Davar | G06Q 10/06393 |
| | | | 705/7.39 |
| 2016/0154856 A1* | 6/2016 | Olof-Ors | G06F 16/24578 |
| | | | 707/728 |
| 2017/0111462 A1* | 4/2017 | Oberli | G06F 16/9535 |
| 2018/0068008 A1* | 3/2018 | Cruanes | G06F 16/211 |
| 2018/0285388 A1* | 10/2018 | Riggs | G06F 16/2379 |
| 2018/0322513 A1* | 11/2018 | Smith | G06Q 30/0201 |
| 2019/0180386 A1* | 6/2019 | Gandhi | G06F 16/248 |
| 2019/0259041 A1* | 8/2019 | Jackson | G06F 16/288 |

OTHER PUBLICATIONS

Faulkender, M., and J. Yang. (2008). Inside the Black Box: The Role and Composition of Compensation Peer Groups. Working Paper, Washington University in St. Louis.

Hawkins, Walter L., Kristin L. Reiter, and George H. Pink. (2017). Peer Group Factors Related To The Financial Performance Of Critical Access Hospitals. Journal of Health Care Finance, 43(4).

Mrak, R. E., T. G. Parslow and B. S. Ducatman. (2018). Benchmarking Subspecialty Practice in Academic Anatomic Pathology: The 2017 Association of Pathology Chairs Survey. Academic pathology, 5, 2374289518798556. doi:10.1177/2374289518798556.

Pedregosa, F. et al. (2011). Scikit-learn: Machine Learning in Python. Journal of Machine Learning Research, 12, 2825-2830.

Pittinsky, M., & T. Diprete. (2013). Peer group ties and executive compensation networks. Social Science Research, 42(6), 1675-1692.

Zodet, M. W. and J. D. Clark. (1996). Creation of Hospital Peer Groups. Clinical Performance and Quality Health Care, 4(1), 51-57.

Zou, H. and T. Hastie (2005). Regularization and Variable Selection via the Elastic Net. Journal of the Royal Statistical Society: Series B (Statistical Methodology), 67, 301-320.

* cited by examiner

SYSTEM FOR DATA STRUCTURE CLUSTERING BASED ON VARIATION IN DATA ATTRIBUTE PERFORMANCE

FIELD OF THE INVENTION

The present invention embraces a system, computer program product, and method for data structure clustering based on variation in data attribute performance. The data structure clustering comprises linking a sub-set of data structures out of a global set of data structures in a vector space to form a peer data cluster based on identifying stimulus type attributes that are structured to produce a functional performance parameter of the associated data structure.

BACKGROUND

Database systems typically store vast amounts of data. For various data processing steps, there is a need for determining, selecting and retrieving similar data elements. However, conventional systems merely employ comparative methods to determine similar data elements. For instance, for determining similar hospitals for a particular hospital, conventional systems merely compare properties or attributes of the particular hospital with properties or attributes of all of the other available hospitals in the database. Similar hospitals are typically identified on the basis of matching alone, leading to inadvertently overlooking otherwise similar hospitals that may comprise dissimilar data in the properties or attributes. For example, conventional systems may incorrectly choose a first teaching hospital and second teaching hospital to be similar based on identifying a teaching match, even though the first teaching hospital may be more similar to another large urban hospital. This process needs to be repeated for determining similar data elements for other data elements. As such the repetitive comparisons of conventional systems are time consuming, processing intensive, and possibly inaccurate.

Moreover, in a variety of practical applications the data elements comprise independent attributes that effect dependent attributes. Conventional systems are not capable of distinguishing independent attributes from dependent attributes. Conventional systems, if at all, merely determine similarities based on matching dependent attributes alone, even though the underlying independent attributes causing these dependent attributes may be greatly different. For example, conventional systems may incorrectly determine that two hospitals are similar based on a similarity in the dependent attribute of worked hours per unit, even though the underlying independent variables that result in the worked hours per unit are entirely different, thereby causing a false similarity.

Accordingly, there is a need for an advanced systems that addresses the above technical problems in existing systems. The data structure clustering based on variation in data attribute performance of the present invention ameliorates the foregoing deficiencies of conventional database technology, and also provides several advantages and improvements.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide a system, computer program product, and a computer-implemented method for data structure clustering based on variation in data attribute performance. In general, the technical system of the invention is structured to link a sub-set of data structures out of a global set of data structures in a vector space to form a peer data cluster based on identifying stimulus type attributes that are structured to produce a functional performance parameter of the associated data structure. The technical system comprises a computer apparatus including at least one memory device with computer-readable program code stored thereon, a network communication device, and at least one processor being. The at least one processor is operatively coupled to the least one memory device and the network communication device such that the processing device is configured to execute the computer-readable program. In some embodiments, the invention is structured to retrieve a plurality of entity data structures associated with a plurality of entities, wherein retrieving the plurality of data structures comprises, for each entity data structure of the plurality of entity data structures, a first functional performance parameter and a plurality of attributes associated with an entity of the plurality of entities. Moreover, the system is structured to identify, for each entity data structure of the plurality of entity data structures, at least one independent attribute of the plurality of attributes associated with the entity that is structured to modify the first functional performance parameter; and construct, for each entity data structure of the plurality of entity data structures, an entity discrete attribute structure associated with an n-dimensional vector space based on the determined at least one independent attribute of the plurality of attributes. Moreover, the invention is configured to receive, from a user device, a user input comprising a request for constructing a peer data cluster for a first entity data structure of the plurality of entity data structures for the first functional performance parameter; and in response, construct the peer data cluster for the first functional performance parameter of the first entity data structure in response to the user input. Typically, constructing the peer data cluster comprises determining a second entity data structure of the plurality of entity data structures that is a peer entity data structure based on an ordered stack of the plurality of entity discrete attribute structures associated with the plurality of entity data structures; and linking the first entity data structure and the second entity data structure to form the peer data cluster. In addition, the invention is configured to display, via a display device of the user device, a real-time interactive user interface comprising a representation of the peer data cluster for the first entity data structure.

In some embodiments, or in combination with any of the previous embodiments, constructing the entity discrete attribute structure further comprises, for each entity data structure of the plurality of entity data structures: determining a weight parameter for each of the at least one independent attribute of the plurality of attributes; and constructing the entity discrete attribute structure such that (i) each of the at least one independent attributes triggers a vector direction of the entity discrete attribute structure in the n-dimensional vector space, and (ii) the associated weight parameter of at least one independent attribute triggers a magnitude of the entity discrete attribute structure in the associated vector direction.

In some embodiments, or in combination with any of the previous embodiments, constructing the peer data cluster for the first entity data structure further comprises: retrieving the plurality of the entity discrete attribute structures associated with the plurality of entity data structures, wherein the plurality of the entity discrete attribute structures are associated with the n-dimensional vector space such that the number of dimensions in the n-dimensional vector space is equal to the number of the at least one independent attribute; determining a first entity discrete attribute structure of the plurality of entity discrete attribute structures that is associated with the first entity data structure; determining a spatial distance between the first entity discrete attribute and each of the plurality of the entity discrete attribute structures in the n-dimensional vector space; and constructing the ordered stack of the plurality of entity discrete attribute structures by arranging the plurality of the entity discrete attribute structures in an ascending order of the spatial distances.

In some embodiments, or in combination with any of the previous embodiments, determining that the second entity data structure is the peer entity data structure of the first entity data structure further comprises: demarcating the ordered stack of the plurality of entity discrete attribute structures into (i) a peer stack comprising a first predetermined number of entity discrete attribute structures out of the plurality of entity discrete attribute structures selected in the ascending order of the spatial distances, and (ii) a non-peer stack comprising entity discrete attribute structures of the plurality of entity discrete attribute structures that are not in the peer stack; determining that a second entity discrete attribute structure of the plurality of entity discrete attribute structures is in the peer stack; and in response to determining that the second entity discrete attribute structure is in the peer stack, determining that the second entity data structure associated with the second entity discrete attribute structure is the peer entity data structure of the first entity data structure.

In some embodiments, or in combination with any of the previous embodiments, linking the first entity data structure and the second entity data structure to form the peer data cluster further comprises: identifying a first entity discrete attribute structure of the plurality of entity discrete attribute structures that is associated with the first entity data structure; and linking the first entity discrete attribute structure with a second entity discrete attribute structure of the plurality of entity discrete attribute structures that is associated with the second entity data structure.

In some embodiments, or in combination with any of the previous embodiments, each of the plurality of entities is a hospital. Moreover the first functional performance parameter is associated with hospital performance, and the plurality of attributes are associated with processes and/or patients associated with the hospital.

In some embodiments, or in combination with any of the previous embodiments, each of the plurality of entities is a hospital department. Moreover the first functional performance parameter is associated with hospital department performance, and the plurality of attributes are associated with processes and/or patients associated with the hospital department.

In some embodiments, or in combination with any of the previous embodiments, the invention is configured to determine an attribute quality associated with the peer data cluster for the first functional performance parameter of the first entity data structure. Here, the attribute quality is associated with a variation in the first functional performance parameter caused by at least one independent attribute for each of the plurality of entity data structures. The invention is further configured to trigger (i) identification of another independent attribute of the plurality of attributes different from the at least one independent attribute, and/or (ii) a reconstruction of the plurality of entity discrete attribute structures, in response to determining that the attribute quality is less than a predetermined first threshold.

In some embodiments, or in combination with any of the previous embodiments, the invention is configured to determine a cluster quality associated with the peer data cluster for the first functional performance parameter of the first entity data structure. Here, the cluster quality is associated with a first degree of similarity between the first entity data structure and the second entity data structure in the peer data cluster, relative to a second degree of similarity between the first entity data structure and all of the plurality of entity data structures. In response to determining that the cluster quality does not match a predetermined threshold range, the invention is configured to reconstruct the peer data cluster such that the peer data cluster the first entity data structure is linked with all of the remaining entity data structures in the plurality of entity data structures.

In some embodiments, or in combination with any of the previous embodiments, the invention is configured to determine a cluster quality associated with the peer data cluster for the first functional performance parameter of the first entity data structure. Here, the cluster quality is associated with a first degree of similarity between the first entity data structure and the second entity data structure in the peer data cluster, relative to a second degree of similarity between the first entity data structure and all of the plurality of entity data structures. In response to determining that the cluster quality does not match a predetermined threshold range, the invention is configured to determine that the plurality of entity data structures are not compatible with the peer data cluster for the first functional performance parameter of the first entity data structure.

In some embodiments, or in combination with any of the previous embodiments, the invention is configured to transmit a notification to user, via the user device, comprising an indication that (i) none of the plurality of entity data structures are compatible with the peer data cluster, or (ii) a number of the plurality of entity data structures is below a minimum threshold.

In some embodiments, or in combination with any of the previous embodiments, the invention is configured to determine an overall quality associated with the peer data cluster for the first functional performance parameter of the first entity data structure. Here, the overall quality is a combination of an attribute quality and a cluster quality, described above. The invention is further configured to reconstruct the peer data cluster in response to determining that the overall quality does not match a predetermined threshold range.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
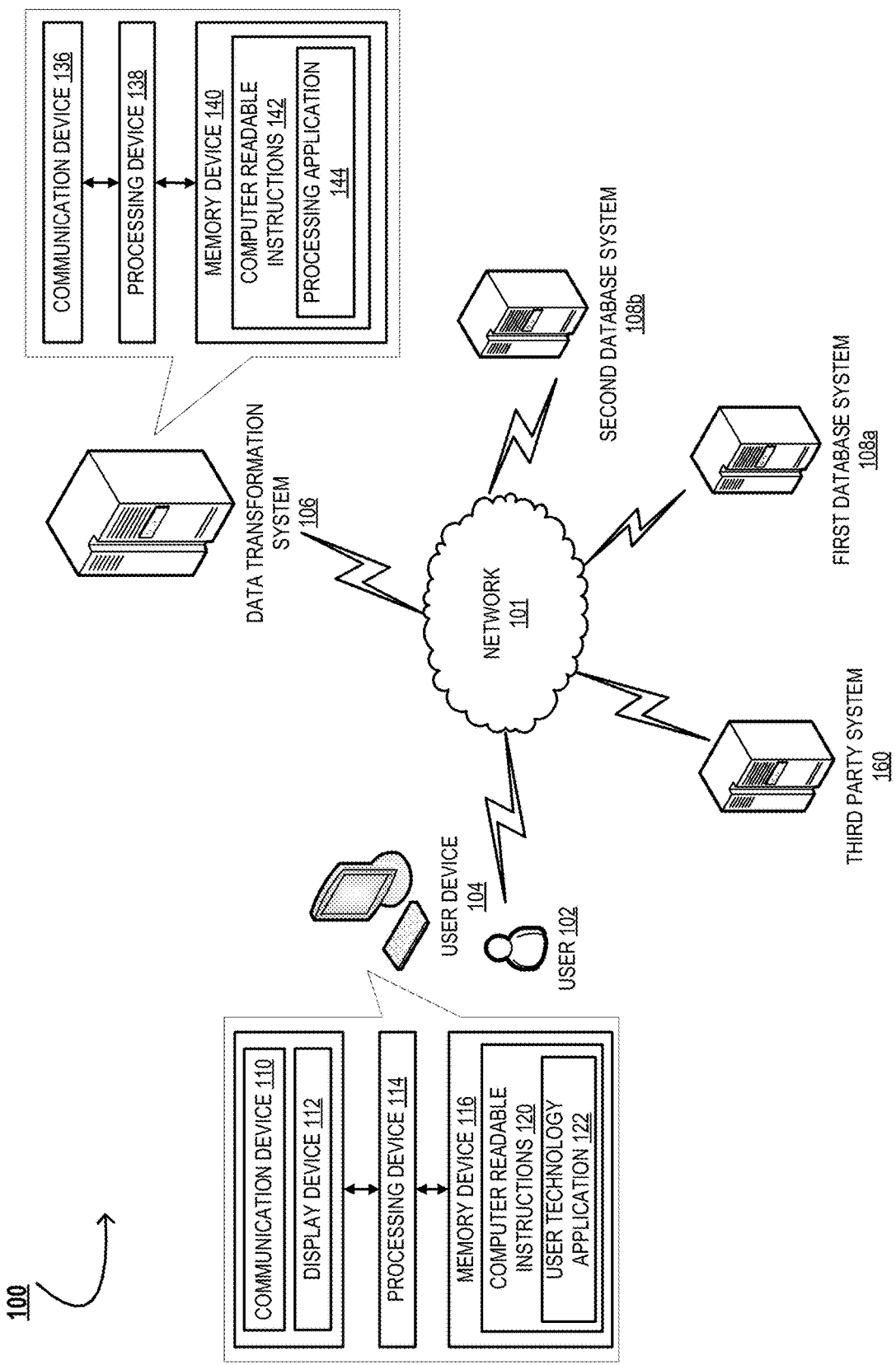
Figure 2:
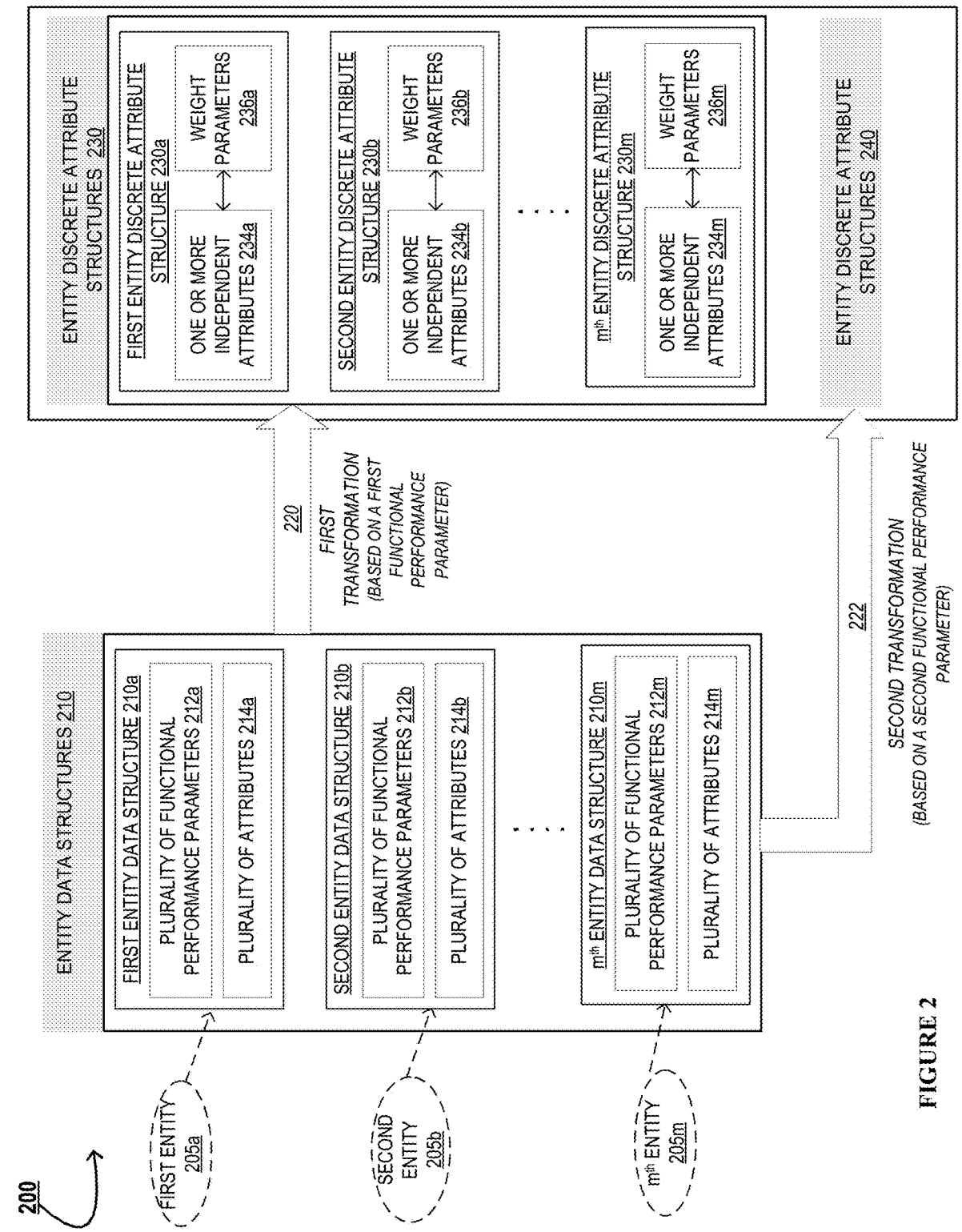
Figure 3A:
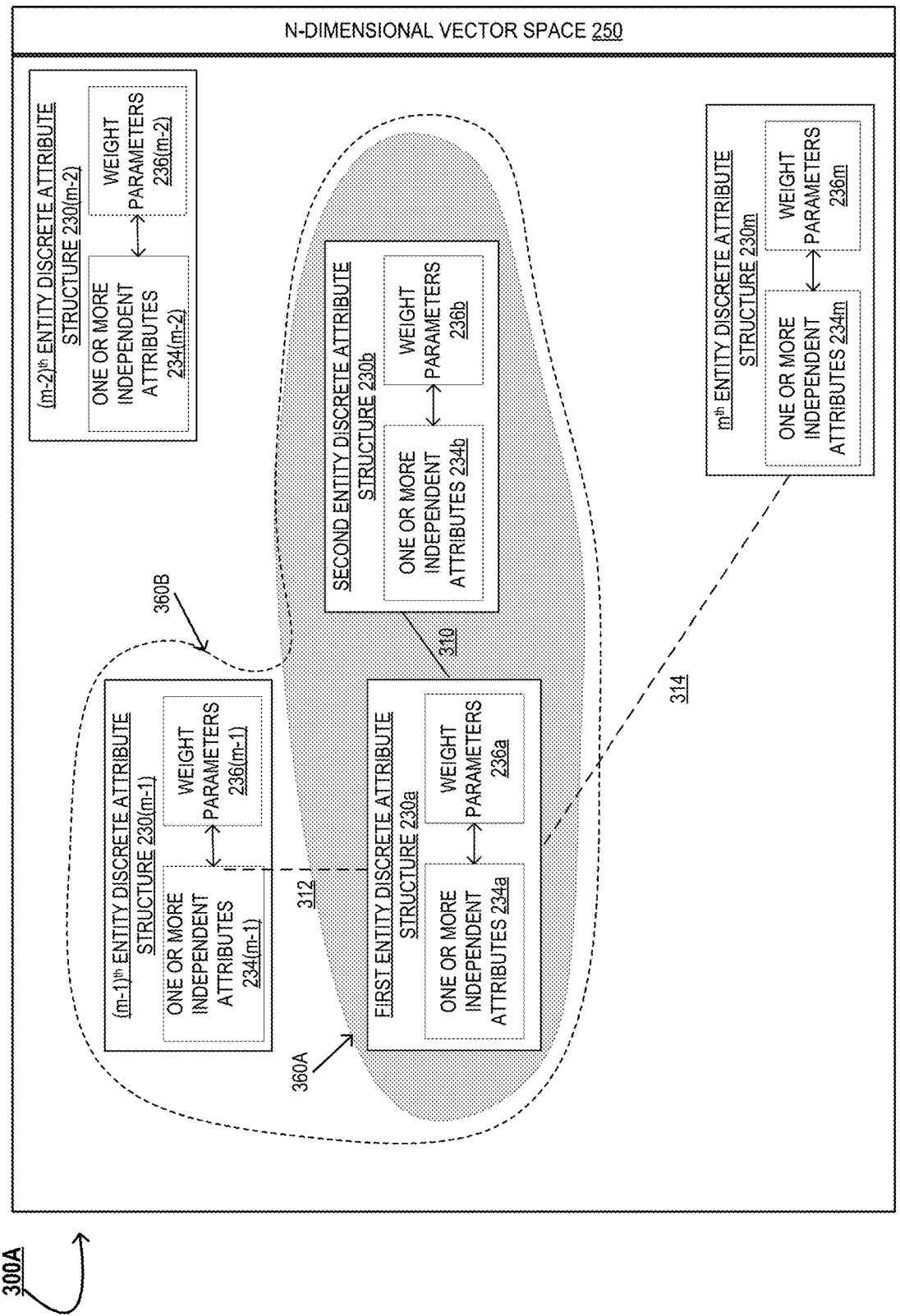
Figure 3B:
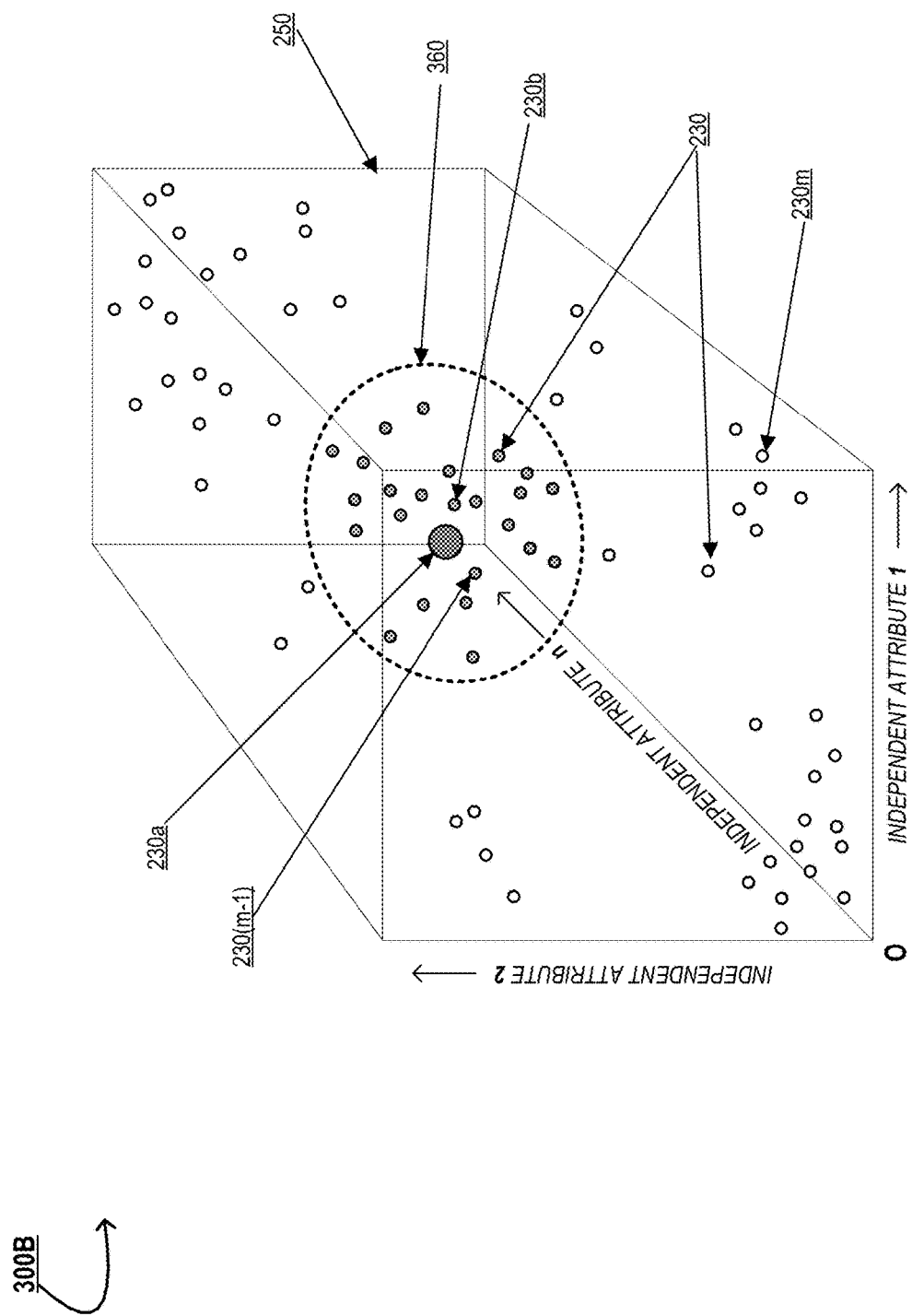
Figure 4:
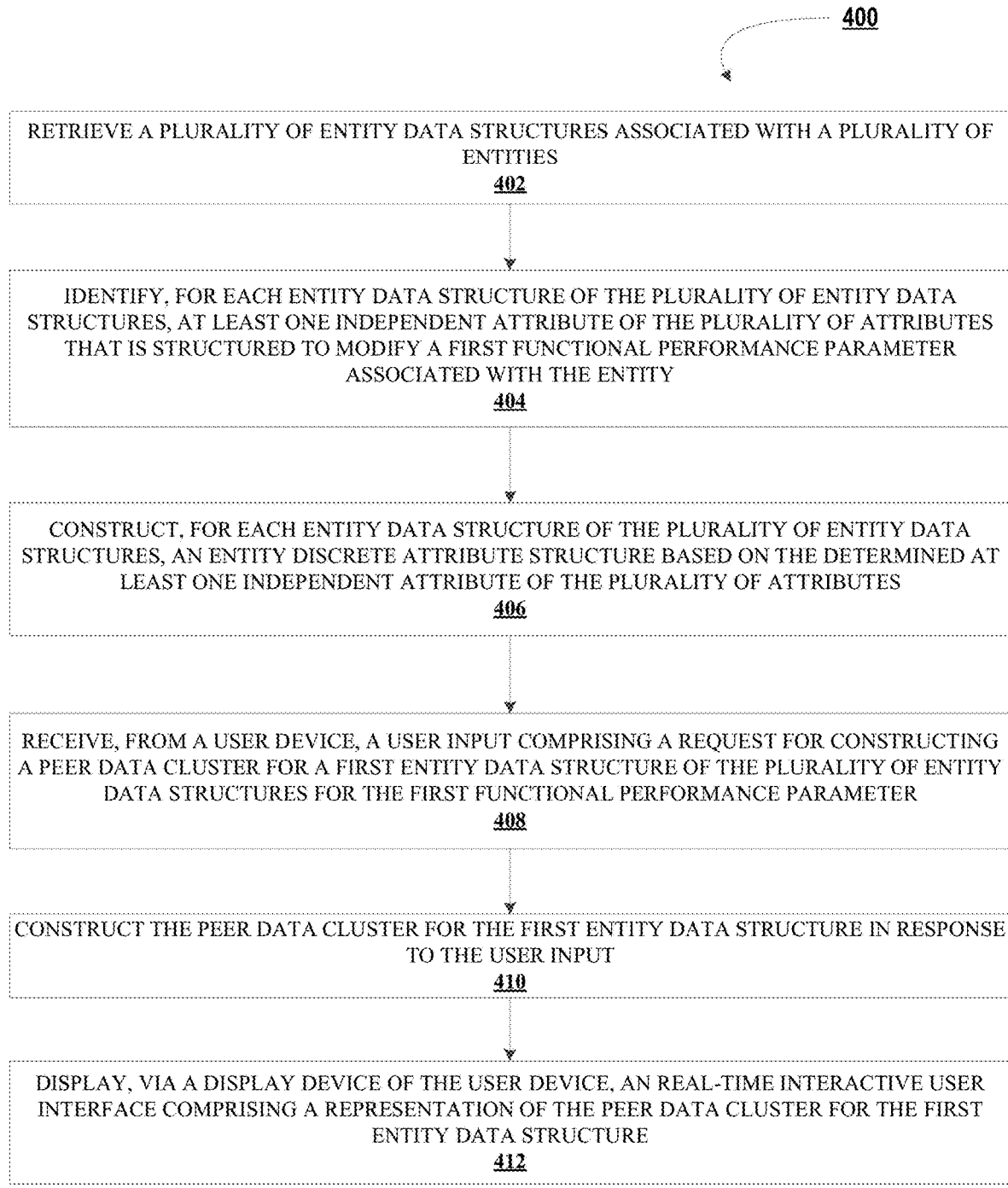
Figure 5:
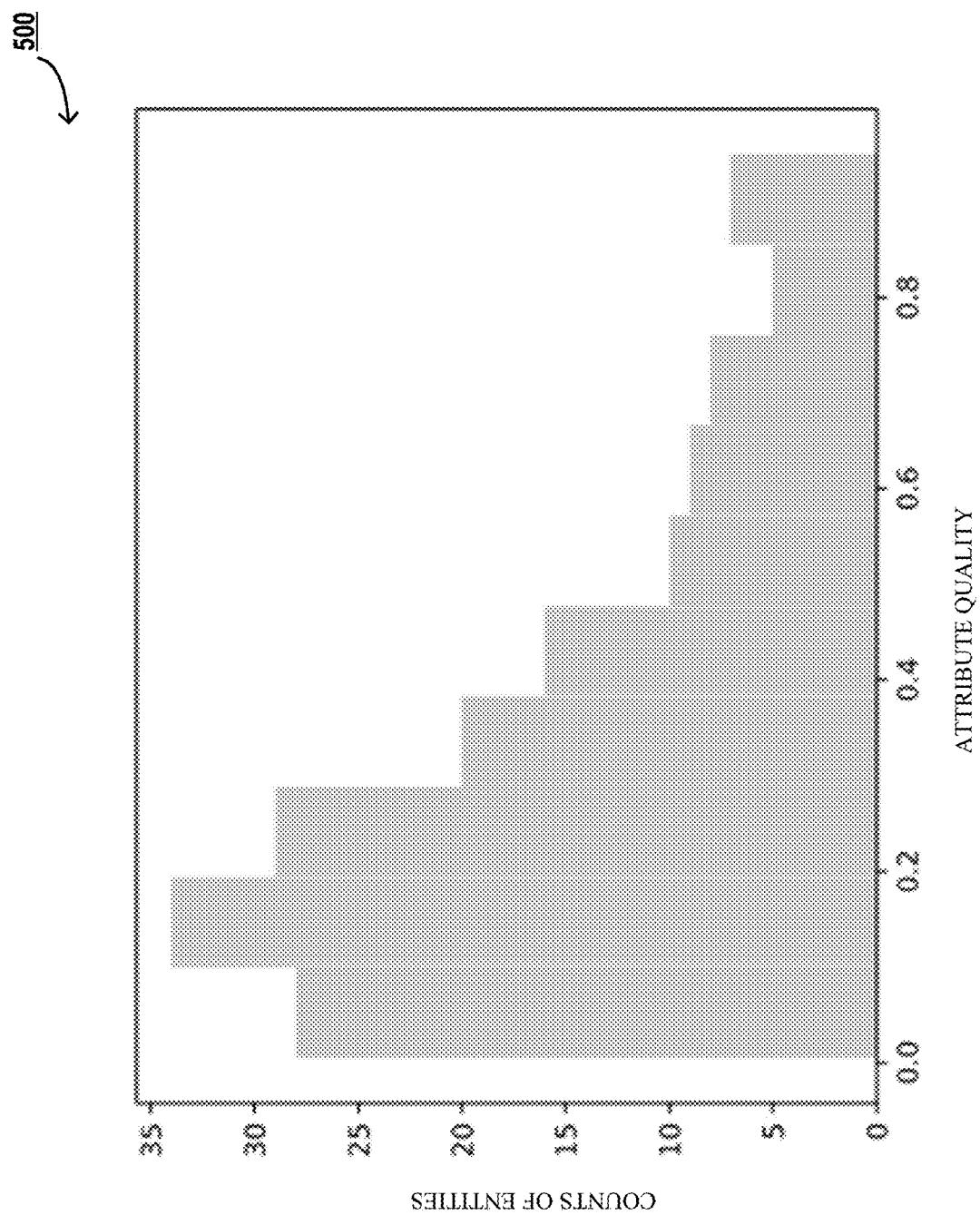
Figure 6A:
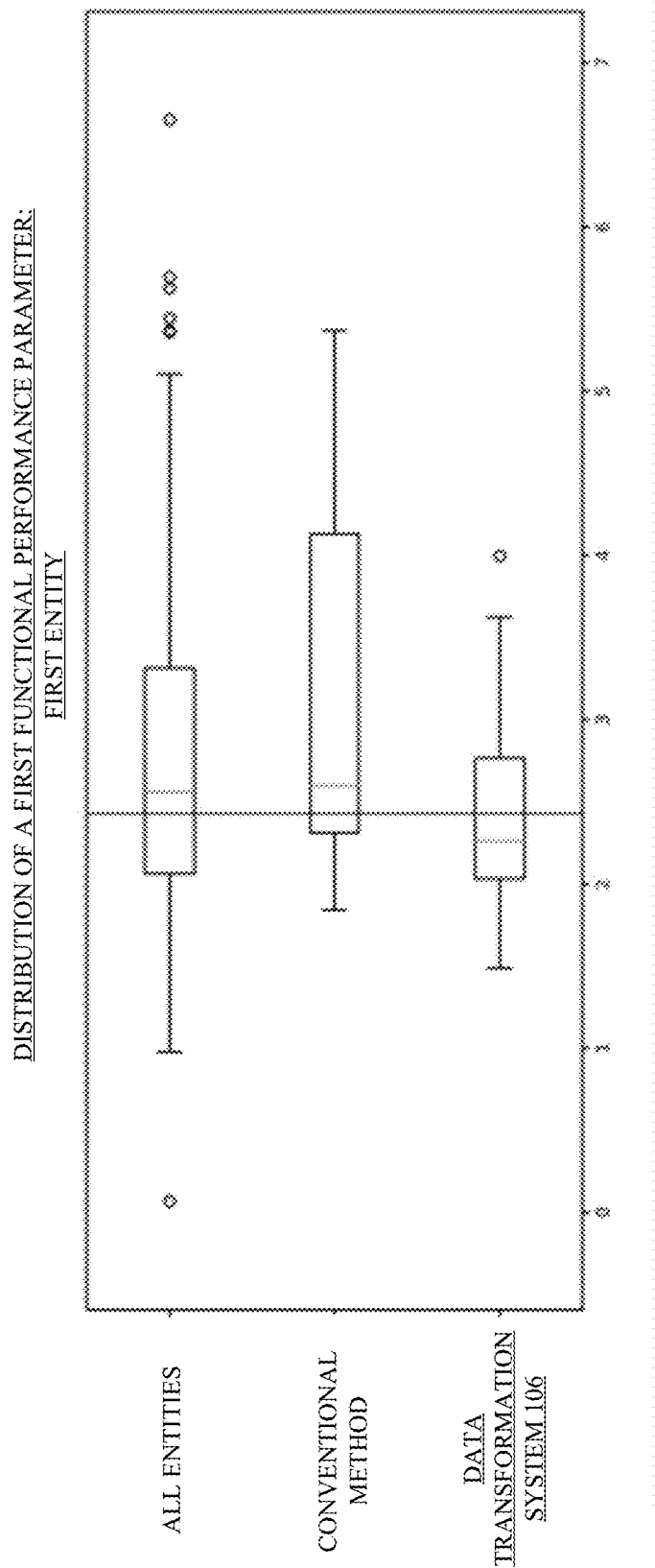
Figure 6B:
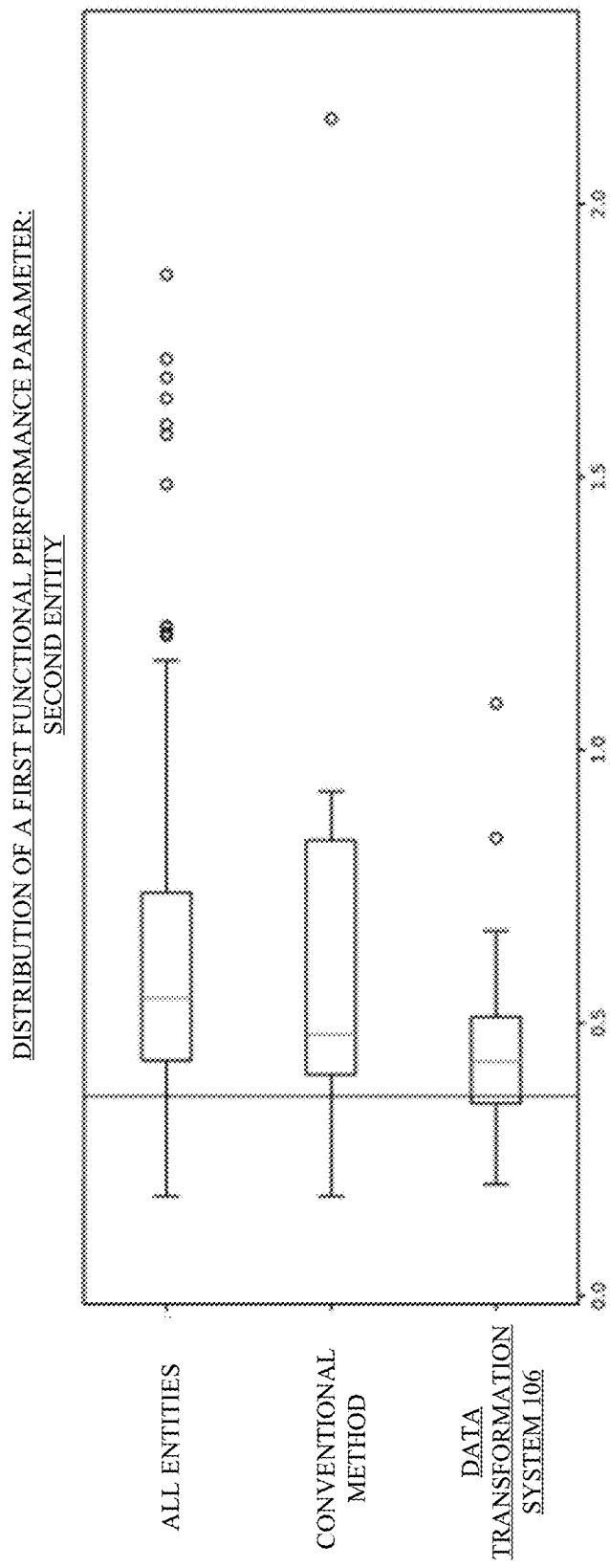
Figure 6C:
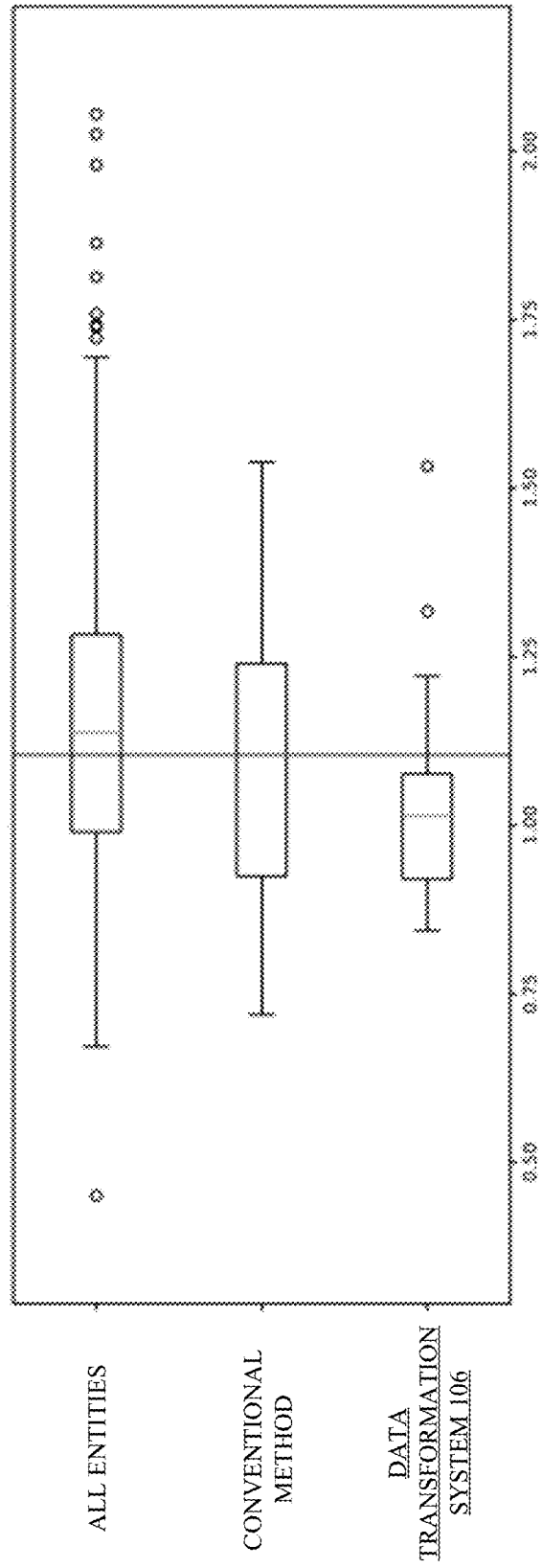

Having thus described embodiments of the invention in general terms, reference will now be made to the accompanying drawings, wherein:

FIG. 1 illustrates a comprehensive data transformation system environment 100, in accordance with some embodiments of the present invention;

FIG. 2 illustrates a high level schematic representation 200 of data transformation data structures, in accordance with some embodiments of the invention;

FIG. 3A illustrates a high level schematic representation 300A of data structure clustering, in accordance with some embodiments of the invention;

FIG. 3B illustrates a high level schematic graphical representation 300B of data structure clustering, in accordance with some embodiments of the invention;

FIG. 4 illustrates a high level process flow 400 for data structure clustering based on variation in data attribute performance, in accordance with some embodiments of the invention;

FIG. 5 illustrates a schematic representation 500 of attribute quality, in accordance with some embodiments of the invention;

FIG. 6A illustrates, an illustrative example 600A depicting the improvements provided by the invention, in accordance with some embodiments of the invention;

FIG. 6B illustrates, an illustrative example 600B depicting the improvements provided by the invention, in accordance with some embodiments of the invention; and FIG. 6C illustrates, an illustrative example 600V depicting the improvements provided by the invention, in accordance with some embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" as used herein may be any institution employing information technology resources and particularly technology infrastructure configured for storing, analyzing a processing diagnostic and medical databases. Typically, an entity is associated with a variety of features and performance metrics. In some embodiments, an "entity" as used herein may refer to a hospital, and/or a hospital department. That said, the entity may be any institution, group, association, hospital, clinic, medical treatment facility, medical research facility, financial institution, insurance provider, federal entity, establishment, company, union, authority or the like, employing diagnostic and medical data. In some embodiments, "entity" may refer to an individual or an organization that owns, operates and/or is otherwise associated with a system of networked computing devices and/or systems on which the comprehensive data transformation system of the present invention is implemented. The entity may be a business organization, a non-profit organization, a government organization, and the like. In other embodiments, the entity may be a single individual who wishes to perform data structure clustering.

"Computing system", "computing device," "server" or "system" as used herein may refer to a networked computing device within the entity system environment or entity system infrastructure (e.g., a system structured for data structure clustering based on variation in data attribute performance, etc.). The computing system may include one or more of a processor, a non-transitory storage medium, a communications device, and a display. The computing system may support user logins and inputs from any combination of similar or disparate devices. Accordingly, in some embodiments, the computing system may be, may comprise or maybe associated with a portable electronic device such as a smartphone, tablet, or laptop, or the computing system may be a stationary unit such as a personal desktop computer, networked terminal, or server. In some embodiments, the computing system may be a local or remote server which is configured to send and/or receive inputs from other computing systems on the network. Furthermore, as used herein the term "user device" or "mobile device" may refer to computing devices such as mobile phones, personal computing devices, tablet computers, wearable devices, and/or any portable electronic device capable of receiving and/or storing data therein.

A "medical diagnostic database," "diagnostic database," "first database" or "second database" as used herein, typically refers to a database that is configured to store a plurality of data structures (e.g., having a plurality of functional parameters, and a plurality of attributes), and/or store discrete attribute structures and data clusters constructed by the present invention. The database may be a relational database, a graph structured database, and/or the like.

A "data structure" or an "entity data structure" is a record, node, or other database element which typically comprises or is associated with a plurality of functional parameters, and a plurality of attributes of a particular entity. The entity data structures may include a pointer to one or more data structures, one or more sub-data structures of lower hierarchies (e.g., a plurality of functional parameters, and/or a plurality of attributes of a particular entity), etc. In general, in some embodiments, each data structure comprises a plurality of functional parameters (e.g., performance data of a hospital department entity such as worked hours per unit), and a plurality of attributes (e.g., properties, characteristics and other data related to the hospital department such as patient volume, location, acute care patient days, etc.). This data structure may be directed to describing, recording, identifying and/or documenting characteristics or features of an entity (e.g., hospital or hospital department). Although referred to as "an entity data structure", it is understood that, in some embodiments each particular entity may be associated with multiple data structures. The data structures, and attributes may comprise descriptive data, textual data, unformatted data, formatted data, or any other available forms of data/information or a combination of forms. This data may be transformed, formatted, encoded, decoded, or otherwise fundamentally altered during storage, retrieval, data/language processing, and other operations.

As described herein, a "user" is an individual associated with an entity. In some embodiments, a "user" may be an employee (e.g., an associate, a physician, a medical practitioner, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein. "User" as used herein may refer to an individual who may utilize the present invention. The user may be an agent, administrator, or employee of the entity who has authorization to add, modify, or delete data, or query existing data, data structures and/or relationships. In other embodiments, the user may be a client or customer of the entity. In yet other embodiments, the user may be unaffiliated with the entity who has some type of interaction with the entity's system.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line, such as those associated with the databases. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. Representations of the constructed data clusters, quality determinations, etc., are typically presented on the user interface.

Database systems typically store vast amounts of data. For various data processing steps, there is a need for determining, selecting and retrieving similar data elements. However, conventional systems merely employ comparative methods to determine similar data elements. For instance, for determining similar hospitals for a particular hospital, conventional systems merely compare properties or attributes of the particular hospital with properties or attributes of all of the other available hospitals in the database. Similar hospitals are typically identified on the basis of matching alone, leading to inadvertently overlooking otherwise similar hospitals that may comprise dissimilar data in the properties or attributes. For example, conventional systems may incorrectly choose a first teaching hospital and second teaching hospital to be similar based on identifying a teaching match, even though the first teaching hospital may be more similar to another large urban hospital. This process needs to be repeated for determining similar data elements for other data elements. As such the repetitive comparisons of conventional systems are time consuming, processing intensive, and possibly inaccurate.

Moreover, in a variety of practical applications the data elements comprise independent attributes that effect dependent attributes. Conventional systems are not capable of distinguishing independent attributes from dependent attributes. Conventional systems, if at all, merely determine similarities based on matching dependent attributes alone, even though the underlying independent attributes causing these dependent attributes may be greatly different. For example, conventional systems may incorrectly determine that two hospitals are similar based on a similarity in the dependent attribute of worked hours per unit, even though the underlying independent variables that result in the worked hours per unit are entirely different, thereby causing a false similarity. In addition, the conventional methods do not lend themselves to post-processing verification and quality analysis.

In addition, typically, these precise data processing and comparison steps cannot be effectively performed manually. Even if it were possible to perform these processes manually, the manual processes would result the same errors and inaccuracies of the conventional systems described above, because manual processes also rely on mere comparison of data, whose faults are outlined above.

Accordingly, there is a need for an advanced systems that addresses the above technical problems in existing systems. The data structure clustering based on variation in data attribute performance of the present invention ameliorates the foregoing deficiencies of conventional database technology, and also provides several advantages and improvements. The technology, features, and functions of the novel comprehensive data transformation system of the present invention will be described in detail below.

FIG. 1 illustrates a comprehensive data transformation system environment 100, in accordance with one embodiment of the present invention, configured for data structure clustering based on variation in data attribute performance. As illustrated in FIG. 1, the data transformation system 106 is operatively coupled, via a network 101 to one or more database systems (108a, 108b), the user system/device 104, and to the third party system 160. In this way, the data transformation system 106 can send information to, and receive information from the one or more database systems (108a, 108b), the user system 104 and the third party system 160 to analyze and modify, in real-time, data structures and their interdependencies across a plurality of database systems (108a, 108b). FIG. 1 illustrates only one example of an embodiment of the comprehensive data transformation system environment 100, and it will be appreciated that in other embodiments one or more of the systems, devices, or servers may be combined into a single system, device, or server, or be made up of multiple systems, devices, or servers.

In some embodiments, the data associated with the data structures of the databases, may be generated by, provided by, accessed by and/or operated upon by the data transformation system 106, by the one or more database systems (108a, 108b), the user device 104 and/or other external or third party systems 160. For example, the system 106 may establish operative communication channels with the one or more database systems (108a, 108b), via the network 101. The system 106 may construct, or cause the first database system 108a to construct, entity data structures 210 having a plurality of functional performance parameters 212 and a plurality of attributes 214, and/the like (e.g., in the form of a class type extensible program-code-template, other object oriented data structures, linked lists, arrays, stacks, etc.), at the first database system 108a. The system 106 may construct, or cause the second database system 108b to construct, entity discrete attribute structures 230, peer data clusters 360 and/or the like, at the second database system 108b. As described previously, the user 102 may refer to employees, technical subject matter experts, operators and other personnel associated with the entity or affiliates of the entity.

The databases comprising the plurality of entity data structures are typically stored in the one or more database systems (108a, 108b). In some embodiments the records (information associated with the data structures, attributes, etc.) from the database systems may be retrieved or accessed based on satisfying requisite authentication/authorization requirements. However, it is contemplated that some or all of the records may be stored in other memory locations/devices, for example, memory device 140, the user device 104, technology resources 150 and the like.

In some embodiments, each of the database systems (108a, 108b) may comprise a database control system, which is configured to receive submitted queries (e.g., retrieval requests, data storage instructions, etc. from the system 106) and manage run time access to the database. In the case of user-submitted queries, the conversion of user-submitted queries may be achieved through a query processor, which may translate the queries and/or commands inputted by the user into low level instructions which may then be executed by the runtime database manager. In this way, the database systems (108a, 108b) are able to provide a layer of abstraction through which the user may use identifiable commands to execute the addition, deletion, modification, querying, and retrieval functions of the database. The database control system may further serve the function of maintaining the structure and fidelity of the data by the use of error checking and/or correction.

In some embodiments, each of the database systems (108a, 108b) may further comprise a database engine which controls, secures and provides access to the data. The database engine may be responsible for authorizing and/or authenticating users and restricting some functions of the database depending on the user class. For instance, an administrator of the entity's systems may be provided with the least restrictive rule set, which may allow the administrator to freely add, remove, edit, and query the data within the database. On the other hand, a client of the entity may be provided only with access to the query functions of the database, while a member of the public may be precluded from utilizing some or any of the functions of the database.

The database systems (108a, 108b) may further comprise a report generation utility which extracts information from the databases and presents it to the user in a number of different formats. The user 102 may be able to select specific records for viewing in a desired format, such as graphs, charts, tables, formatted text, and the like. As the system allows for increasingly complex data mapping and relationships, the report generation utility is also able to display the complex data in a way that is most relevant and comprehensible to the user.

In some embodiments, in application of the invention in hospital applications, the database systems (108a, 108b) comprise thousands of data points about hundreds of hospitals that describe structural attributes at the facility and department levels, as well as the processes and tools used in administration and delivery of care. Having so many features about each hospital and department requires a statistical method to identify those features that best explain variation in performance. Any data point about a hospital or department, an operational process within a hospital, or the descriptors of the underlying patient population are referred to as "attributes" or "features". Typically, all of these attributes describe something about a hospital that might impact or explain variation in certain measures of hospital performance ("functional performance parameter"). The present invention determines the combination of these attributes that explains the most variation in functional performance parameters (e.g., labor productivity), for a given department across all hospitals. Furthermore, the present invention determines the relative importance of each of those attributes—specifically the magnitude and direction of each attribute's effect on a particular functional performance parameters, controlling for all other functional performance parameters/features.

The network 101 may be a global area network (GAN), such as the Internet, a wide area network (WAN), a local area network (LAN), near field communication network, audio/radio communication network, ultra-high frequency wireless communication network, or any other type of network or combination of networks. The network 101 may provide for wireline, wireless, or a combination wireline and wireless communication between devices on the network 101.

In some embodiments, the user 102 is an individual associated with the entity. In some embodiments, the user 102 may access the data transformation system 106 through an interface comprising a webpage or a user technology application 122. Hereinafter, "user technology application" is used to refer to an application on the user system 104 of a user, a widget, a webpage accessed through a browser, and the like. In some embodiments the user technology application 122 is a system application stored on the user system 104. In some embodiments the user technology application may refer to a third party application or a user application stored on a cloud used to access the resource processing system through a network. In some embodiments, at least a portion of the user technology application 122 is stored on the memory device 140 of the data transformation system 106. The user 102 may subsequently navigate through the interface, retrieve one or more data structure records, provide confirmation, or review presented information using a user system 104.

FIG. 1 also illustrates the user system 104. The user system 104 generally comprises a communication device 110, a display device 112, a processing device 114, and a memory device 116. The user system 104 is a computing system that allows a user 102 to interact with the data transformation system 106 to request information, provide instructions, view results, etc. The processing device 114 is operatively coupled to the communication device 110, the display device 112, and the memory device 116. The processing device 114 uses the communication device 110 to communicate with the network 101 and other devices on the network 101, such as, but not limited to the third party system 160 and the data transformation system 106. As such, the communication device 110 generally comprises a modem, server, or other device for communicating with other systems/devices on the network 101. In some embodiments the network 101 comprises a network of distributed servers.

The user system 104 comprises computer-readable instructions 120 stored in the memory device 116/data storage, which in one embodiment includes the computer-readable instructions 120 of the user technology application 122. In this way, a user 102 may remotely communicate with the data transformation system 106, view retrieved data and visual displays, and/or modify, authorize, or monitor the implementation of data clustering activities using the user system 104 and the database systems (108a, 108b). The user system 104 may be, for example, a desktop personal computer, a mobile system, such as a cellular phone, smart phone, personal data assistant (PDA), laptop, or the like. Although only a single user system 104 is depicted in FIG. 1, the system environment 100 may contain numerous user systems 104.

As further illustrated in FIG. 1, the data transformation system 106 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs or one or more modules, based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the one or more database systems (108a, 108b), the third party system 160 and the user system 104. As such, the communication device 136 generally comprises a modem, server, or other device for communicating with other devices on the network 101.

As further illustrated in FIG. 1, the data transformation system 106 comprises computer-readable instructions 142 stored in the memory device 140, which in one embodiment includes the computer-readable instructions 142 of a processing application 144 configured for data structure clustering based on variation in data attribute performance (described with respect to FIGS. 2-4 below).

As further illustrated by FIG. 1, the system environment 100 further comprises a one or more database systems (108a, 108b). The system environment 100 may further comprise technology resources such as system hardware, technology devices and applications, operating systems, servers, technology applications, internal networks, storage/databases, user interfaces, authentication operations, middleware, program products, external networks, hosting/facilities, business/technology processes, and other technology resources or technology assets associated with the entity, not illustrated herein.

As discussed, the present invention is structured for data structure clustering based on variation in data attribute performance. Although the data structure clustering of the present invention finds many technical/practical applications in a variety of fields, the features and functions of the present invention are described herein using examples of implementation in the context of hospital type entities. It should be understood that these examples are provided for illustrative purposes only, and are not intended to limit the scope of the present invention. As discussed, the present invention is structured to link a sub-set of data structures out of a global set of data structures in a vector space to form a peer group ("peer data cluster") based on identifying stimulus type attributes (independent attributes) that are structured to produce a functional performance parameter (dependent attributes) of the associated data structure. In the non-limiting context of hospitals, the independent feature selection, data clustering, and an extensive database of hospital characteristics of the present invention allows for identification of independent hospital attributes that explain variation in a functional performance parameter (performance metric) of interest, and to find peer hospitals that are similar in ways that matter to that functional performance parameter.

In some embodiments described herein, the present invention provides a system and process for choosing criteria for selecting peers, and adds consistency and transparency to the selection of peer group themselves (e.g., by using elastic net or another feature selection technique), in combination with k-nearest neighbors data clustering. This ensures that entities (e.g., hospitals or hospital departments) are comparing themselves to peers that are similarly situated in ways that matter to a particular functional performance parameter (performance metric). It further mitigates inherent errors described previously, and potential bias (unintentional or otherwise) that can creep into the process of choosing peers using conventional comparison methods and systems.

In the context of implementation of the present invention in hospital applications, as described, any data point about a hospital or department, an operational process within a hospital, or the descriptors of the underlying patient population may be referred to as "attributes" or "features". Typically, all of these attributes describe something about a hospital that might impact or explain variation in certain measures of hospital performance ("functional performance parameter"). The present invention determines the combination of these attributes that explains the most variation in functional performance parameters (e.g., labor productivity), for a given department across all hospitals. Furthermore, the present invention determines the relative importance of each of those attributes—specifically the magnitude and direction of each attribute's effect on a particular functional performance parameters, controlling for all other functional performance parameters/features. These features and function of the present invention will now be described in detail with respect to FIGS. 2-4.

FIG. 2 illustrates a high level schematic representation 200 of data transformation data structures, in accordance with some embodiments of the invention. FIG. 3A illustrates a high level schematic representation 300A of data structure clustering, in accordance with some embodiments of the invention. FIG. 3B illustrates a high level schematic graphical representation 300B of data structure clustering of FIG. 3A, in accordance with some embodiments of the invention. FIG. 4 illustrates a high level process flow 400 for data structure clustering based on variation in data attribute performance, in accordance with some embodiments of the invention.

Specifically, FIGS. 2 and 3A-3B depict a line and symbol diagram representations of some of the data structures that may be constructed by the system and or that may exist within the multidimensional databases, in accordance with some embodiments of the present invention. FIGS. 2 and 3A-3B illustrate non-limiting examples of the data transformations performed by the invention. FIG. 4 outlines the algorithm process steps for performing the data transformations depicted in FIGS. 2 and 3A-3B. Typically, the process steps described herein are performed by the processing device 138 of the data transformation system 106, based on executing computer readable instructions/code 142 of the processing application 144, in some embodiments of the invention. The "system" as used herein may refer to the data transformation system 106.

Now referring FIG. 4, in conjunction with the schematic representations illustrated in FIG. 2, the system 106 may retrieve a retrieve a plurality of entity data structures 210 associated with a plurality of entities 205, e.g., from database systems (108a, 108b), at block 402 of process flow 400. Each entity data structure (210a-210m) is typically associated with a particular entity (205a-205m) (e.g., hospital or hospital department) and comprises operational process data within the entity, the descriptors of the underlying factors, and/or other data associated with the entity. Specifically, each entity data structure (210a-210m) may comprise a plurality of (or at least one of) functional performance parameters (212a-212m) and a plurality of (or at least one of) attributes (214a-214m), as illustrated by FIG. 2. Typically, the plurality of attributes (214a-214m) describe features, functions, or other parameters associated with the corresponding entity (e.g., urban geographic location of the hospital, location of the department in an acute care hospital, location of the department in a teaching hospital, patient volume, patient characteristics, etc.), while the functional performance parameters (212a-212m) describe performance metrics of the entity (e.g., worked hours per unit, relative department performance, patient discharge time, etc.). In some embodiments, each of the plurality of entities is a hospital and/or a hospital department, wherein the first functional performance parameter is associated with hospital performance, and wherein the plurality of attributes are associated with processes and/or patients associated with the hospital.

Next, at block 404, in order to construct a peer data cluster or a peer group that is structured to link the entity data structures of the plurality of entity data structures 210 that are similar, or whose corresponding entities are peers with respect to a first functional performance parameter (of the plurality of functional performance parameters 212a) in a way that explains the incidence/prevalence/magnitudes of the first functional performance parameter, i.e., the stimuli/independent variables underlying the first functional performance parameter, the system 106 performs a first transformation 220 (illustrated by FIG. 2). Here, the system may first identify at least one independent attribute (234a-234m) (or one or more attributes) of the plurality of attributes (214a-214m) that is structured to cause, modify, stimulate, or otherwise affects the first functional performance parameter, for each entity data structure (210a-210m) of the plurality of entity data structures 210. Next, the system 106 may determine and correlate weight parameters (236a-236m) (e.g., coefficients) for each of the at least one independent attributes (234a-234m).

Subsequently, at block 406, for each entity data structure (210a-210m), the system may construct an entity discrete attribute structure (230a-230m) associated with an n-dimensional vector space comprising (i) the independent attributes (234a-234m) and the corresponding (ii) weight parameters (236a-236m). Typically, the independent attributes (234a-234m) are each associated with a vector dimension of the n-dimensional vector space. For instance, if the system identifies 26 independent attributes (234a-234m), the n-dimensional vector space has 26 vector dimensions, with "n" being equal to 26. The corresponding weight parameter (236a-236m) of the independent attribute (234a-234m) drives or triggers or provides a magnitude to the independent attribute in its respective vector direction. Typically, the system constructs the entity discrete attribute structure (230a-230m) based on linking, correlating or mathematically assembling (i) the independent attributes (234a-234m) and the corresponding (ii) weight parameters (236a-236m).

In some embodiments, the system utilizes a linear or logistic regression model for performing the independent attribute selection, weight/coefficient determination, and entity discrete attribute structure construction. Here, the entity discrete attribute structure may take the form of a quadratic function. In particular, in some embodiments, the system employs an elastic net implementation using the Python programming language. The system configures the elastic net implementation such that it explains the most variation in first functional performance parameter. Moreover, the underlying implementation performed by the system employs ordinary least squares regression, with two added penalty terms that balance between minimizing the number of independent attributes selected and the size of the weight parameters (e.g., coefficients) of those attributes.

Here, the system may first construct a linear regression model, as depicted below, with "p" being the number of attributes:

$$\hat{y} = \hat{\beta}_0 + x_1\hat{\beta}_1 + \ldots + x_p\hat{\beta}_p$$

or, equivalently, in matrix notation, the foregoing function may be represented as:

$$\hat{y} = X\hat{\beta}$$

Specifically, the system may determine $\hat{\beta}$ using the elastic net method as follows:

$$\hat{\beta} = \mathrm{argmin}(\|y - X\beta\|^2 + \lambda_1\|\beta\|_1 + \lambda_2\|\beta\|^2)$$

Here, the system typically selects and/or optimizes penalty terms $\lambda_1$ and $\lambda_2$ through multiple iterations of cross-validation to find the parameters that balance simplicity and explanatory power while avoiding over-fitting, e.g., based on employing an ElasticNetCV function of the Python programming language.

In some embodiments, the system stratifies the construction of the entity discrete attribute structures by department, volume metric, and/or performance metric such that, for example, (i) entity discrete attribute structures 230 based on the first transformation 220 explain the variation in the first functional performance parameter (e.g., worked hours per visit within emergency departments) across all entities (e.g., hospitals), while (ii) another second transformation 222 and the associated entity discrete attribute structures 240 explains the variation in a second functional performance parameter (e.g., worked hours per patient discharge within pharmacies) across all entities (e.g., hospitals). The second transformation 222 and the associated entity discrete attribute structures 240 are constructed in a similar manner to the first transformation 220 and the entity discrete attribute structures 230 above. Moreover, the system may perform other transformations for other functional performance parameters, in a similar manner. In some instances, in the context of hospital implementations, department volume may be treated as an interval variable, while some other hospital attributes may be treated as nominal (dummy) variables.

The entity discrete attribute structures are constructed such that, the resulting weight parameters/coefficients from the elastic net regression show the magnitude and direction of effect for each independent attribute. These entity discrete attribute structures are used as to construct peer clusters/groups using weighted k-nearest neighbors clustering, as will be described later on. In some embodiments, the constructed entity discrete attribute structures are reviewed by a user (e.g., a subject matter expert) as a quality check to ensure that the selected attributes could plausibly be related to department performance.

As an example, the weight parameters/coefficients 236 and the associated independent attributes 234 for a first functional performance parameter of worked hours per patient day within adult psychiatric units, across all entities 205 are provided in Table 1 below. The $R^2$ statistic for this particular example is 6. This is an example of one model stratum which can be used in conjunction with k-nearest neighbors clustering to form a meaningful hospital peer group.

TABLE 1

Independent attributes and weight parameters that explain worked hours per patient day within adult psychiatric units:

| Weight parameters 236 | Independent attributes 234 |
| --- | --- |
| −0.0043521 | Volume (adult psychiatric patient days) |
| −0.1894582 | Patient transport within the facility performed by unit personnel >80% of the time |

TABLE 1-continued

Independent attributes and weight parameters that explain worked hours per patient day within adult psychiatric units:

| Weight parameters 236 | Independent attributes 234 |
|---|---|
| −0.0303471 | Wound care is performed by unit personnel at least 80% of the time |
| 0.03878704 | <10% of patients receive Electroconvulsive Therapy (ECT) |
| 0.08168252 | Non-ambulatory patients are treated in the unit |
| −0.1320048 | Patients receiving IV therapy are treated in the unit |
| −0.1042582 | <5% of total worked hours are sitter hours |
| −0.0029879 | 7 (or more) patients for each licensed (RN and LPN) bedside nurse on the night shift |
| 0.24251009 | Typical Case Manager/Discharge Planner to patient ratio is between 1:11 and 1:15 |
| 0.30672371 | 12 hour shifts are typically utilized in the unit |
| 0.07006831 | Mostly semi-private rooms |
| 0.03213019 | A state hospital is available for transfers from the unit after a designated period of time |
| −0.1065709 | Location of unit is in an acute care hospital |
| 0.19043129 | Unit is within a non-teaching hospital |
| −0.1676467 | Unit is within a teaching, non-COTH member |
| 0.01614674 | 81-90% of patient days are comprised of Acute Care patient days (hospital) |
| −0.1667573 | 91-100% of patient days is comprised of Acute Care patient days (hospital) |
| −0.1031199 | Centralized Patient Billing is provided at a corporate level for the facility |
| −0.0449393 | Executive Offices are provided at a corporate level for the facility |
| −0.099324 | Fiscal Services are provided at a corporate level for the facility |
| −0.2648611 | Human Resources provided at a corporate level for the facility |
| −0.1283289 | Information Services provided at a corporate level for the facility |
| −0.0366204 | In-house Clinical Trials Program clinical services are reported by this facility (hospital) |
| −0.0790153 | Open Heart Surgery clinical services are reported by this facility (hospital) |
| 0.25142843 | Outpatient Psychiatric/Substance Abuse clinical services are reported by this facility |
| −0.0989938 | The facility is not part of a corporate organization (hospital) |

Now referring block 408 of FIG. 4, in conjunction with the schematic representations illustrated in FIGS. 3A-3B, the system 106 receive a user input comprising a request for constructing a peer data cluster for a first entity data structure 210a of entity 205a of the plurality of entity data structures 210 for the first functional performance parameter, from a user device 104. In response, the system may determine a first entity discrete attribute structure 230a of the plurality of entity discrete attribute structures 230 that is associated with the first entity data structure 210a.

In response, as indicated by block 410, the system may construct the peer data cluster 360 for the first functional performance parameter of the first entity data structure 230a. Here, the system constructs the peer data cluster 360 by k-nearest neighbors clustering, which typically structured to find a fixed number of entity data structures of entities (e.g., hospitals) that are most similar to first entity data structure 230a of a particular entity 205a (e.g., a specific hospital). Each constructed entity discrete attribute structure 230a-230m is positioned in an n-dimensional vector space 250, where each dimension represents an independent attribute that explains variation in first functional performance parameter (e.g., as determined by the elastic net feature-selection process, above). Note that the entities are not positioned according to their actual performance, but rather according to their independent attributes that affect the variation in performance. Although there are n-dimensions in the n-dimensional vector space 250 which cannot be represented easily in their entirety on paper, it is noted that FIG. 3A provides a schematic representation of the positioning of the constructed entity discrete attribute structures 230a-230m, while FIG. 3B provides its graphical representation in 3-dimensions, for ease of visualization purposes.

After spatially positioning the entity discrete attribute structures 230a-230m in accordance with their weight parameters along the independent attribute vectors, the system may then determine spatial distances between the first entity discrete attribute 230a and each of the remaining plurality of the entity discrete attribute structures 230b-230m, in the n-dimensional vector space. Here, in some embodiments, the system may determine Euclidean spatial distances between the first entity discrete attribute 230a and every other entity discrete attribute 230b-230m, e.g., using the calculation below:

$$\sqrt{\sum_{i=1}^{n}(q_i - p_i)^2}$$

Here, $p=(p_1, p_2, \ldots p_n)$ and $q=(q_1, q_2, \ldots q_n)$ are the Cartesian coordinates of each entity data structure's weight parameters of the independent attributes, which are may be determined by multiplying the weight parameters with a value of the respective independent attribute. In other words, the spatial or Euclidean distance is the distance in the n-dimensional vector space, where every impactful independent variable is represented as a single dimension, weighted by its effect on performance. This distance represents how dissimilar the two entity data structures are. A value of zero means they are the same while large distance suggests there are significant differences between the two entity data structures in ways that impact/affect performance parameters.

Next, the system may construct an ordered stack of the plurality of entity discrete attribute structures 230 by arranging the plurality of the entity discrete attribute structures 230 in an ascending order of the spatial distances. For example, for the example provided in FIG. 3, the ordered stack in ascending order of distances would comprise:

"[entity discrete attribute structure 230b (with the smallest distance 310)], [entity discrete attribute structure 230(m−1) (with the next smallest distance 312)], [entity discrete attribute structure 230m (with the next smallest distance 314)], [entity discrete attribute structure 230(m−2)] . . . " and so on until the entity discrete attribute structure with the largest distance.

The system may then demarcate the ordered stack of the plurality of entity discrete attribute structures into (i) a peer stack comprising a first predetermined number of entity discrete attribute structures (e.g., 5, 25, 30, etc.) out of the plurality of entity discrete attribute structures selected in the ascending order of the spatial distances, and (ii) a non-peer stack comprising entity discrete attribute structures of the plurality of entity discrete attribute structures that are not in the peer stack. The peer stack consists of a fixed number of the closest structures. Continuing with the previous example, the system may determine the first predetermined number of entity discrete attribute structures to be 1 (or the user may input the required number of entity structures in the peer cluster), and demarcate the first peer stack as comprising the first structure in the stack, i.e., entity discrete attribute structure 230b and the non-peer stack as comprising the remaining entity discrete attribute structures 230c-230m. Continuing with the previous example, the system may determine the first predetermined number of entity discrete attribute structures to be 2 (or the user may input the required number of entity structures in the peer cluster), and subsequently construct the first peer stack comprising the first two structures in the stack, i.e., entity discrete attribute structures 230b and entity discrete attribute structure 230 (m–1), and the non-peer stack as comprising the remaining entity discrete attribute structures 230c-230(m-2) and 230m. In some embodiments, the predetermined number of entity discrete attribute structures is 15, 20, 25, 30, and/or the like. Typically, the system determines the predetermined number of entity discrete attribute structures such that the peer stack is large enough to include as many similar structures as possible without being so large as to include structures that are dissimilar.

The system may then construct the peer data cluster 360 by linking the first entity discrete attribute structure 230a with each of the entity discrete attribute structures in the peer stack, as indicated by block 410. Continuing with the example illustrated on FIG. 3A, for a first predetermined number of 1, the system may construct a peer data cluster 360A by linking the first entity data structure 210a (i.e., the corresponding first entity discrete attribute structure 230a) and the second entity data structure 210b (i.e., the corresponding second entity discrete attribute structure 230b). Similarly, for a first predetermined number of 2, the system may construct a peer data cluster 360B by linking the first entity data structure 210a (i.e., the corresponding first entity discrete attribute structure 230a) with both the second entity data structure 210b (i.e., the corresponding second entity discrete attribute structure 230b) and the $(m-1)^{th}$ entity data structure 210(m-1) (i.e., the corresponding $(m-1)^{th}$ entity discrete attribute structure 230(m-1)). It is noted that linking the entity data structures, as used herein, refers to, identifying the corresponding entity discrete attribute structures, and linking the corresponding entity discrete attribute structures.

Next, at block 412, the system may display, via a display device of the user device, a real-time interactive user interface comprising a representation of the peer data cluster for the first entity data structure. The representation of the peer data cluster may be one or more of the representations illustrated in FIGS. 3A-3B, and 6A-6C. Moreover, the system may determine a quality of the peer data cluster and present it on the real-time interactive user interface. The determination of the quality of the peer data cluster will be described below.

Upon constructing the peer data cluster, the system may determine various quality parameters associated with the peer data cluster, such as (i) an attribute quality indicating how much variation in the first functional performance parameter is explained by/caused by at least one independent attribute for each of the plurality of entity data structures, and (ii) a cluster quality indicating the degree of similarity within the peer data cluster, relative to all of the plurality of entity data structures. The system may further determine an overall quality by combining the (i) attribute quality and the (ii) cluster quality, as will be described below.

Attribute Quality

As alluded to above, attribute quality is a measure of how much variation in the first functional performance parameter is explained by/caused by the determined independent attributes. In some embodiments, the system may determine the attribute quality based on an R-squared function. The R-squared function represents the percent of variation in first functional performance parameter that is explained by the entity discrete attribute structure using the independent attributes chosen by elastic net. In some embodiments, there may be significant variation in the R-squared statistic across model strata. For some strata, the characteristics known about the entities (e.g., hospitals) in the database systems explain the majority of the variation in functional performance parameters while others may not explain much variation in performance.

A peer data cluster that is similar to the first entity data structure in ways that explain most of the variation in functional performance parameters is the most ideal. Alternatively, a peer data cluster that is similar but in ways that do not explain much variation in performance, is not much better a basis for comparison than a random group of entities (as would be the case when employing conventional systems). The R-squared function provides how much the independent attributes used in the peer data cluster formation matter to the associated functional performance parameter, when taken together.

FIG. 5 illustrates an example distribution of R-squared coefficients across a group of peer data clusters in which the functional performance parameter is worked hours per unit (WHpU). Typically, a predetermined first threshold, i.e., a minimum R-squared for a peer data cluster that explains more than half of the variation in its functional performance parameter is determined. If the system determines that the attribute quality is greater than or equal to the predetermined first threshold, the system allows the display of the user interface comprising a representation of the peer data cluster for the first entity data structure, at block 412. Alternatively, if the system determines that the attribute quality is less than the predetermined first threshold, the system may automatically and in real-time, block the display of the user interface comprising a representation of the peer data cluster for the first entity data structure, at block 412. Here, the system may also automatically and in real-time trigger (i) identification of another independent attribute of the plurality of attributes different from the at least one independent attribute by causing control to flow back to block 404, and/or (ii) a reconstruction of the plurality of entity discrete attribute structures by causing control to flow back to block 406.

Cluster Quality

As alluded to above, a cluster quality indicates the degree of similarity within the peer data cluster, relative to all of the plurality of entity data structures. In other words, the cluster quality is associated with a first degree of similarity (e.g., median distance) between the first entity data structure and the second entity data structure in the peer data cluster, relative to a second degree of similarity (e.g., median distance) between the first entity data structure and all of the plurality of entity data structures. The system typically determines the cluster quality as a distance ratio, i.e., a ratio of median distance between the first data structure (or another data structure at the center of the peer data cluster) and all of its peers, to the median distance from it to all the data structures. The median distances are calculated using the Euclidean distances determined above when the entity discrete attribute structures associated with the entity data structures are positioned in the n-dimensional vector space, in some embodiments. The distance ratio can be represented as:

$$\text{Distance Ratio} = \frac{\text{Median distance to data structures within peer data cluster}}{\text{Median distance to all data structures}}$$

Typically, high quality peer data clusters are those where the median distance to entity peers within the group is small relative to the median distance to all entities. The above ratio ranges typically from zero to one. The closer to zero, the more similarity within the peer group and the less similarity to all other entity structures, i.e., the distance ratio being within a predetermined threshold range, the better the quality. If the system determines that the cluster quality. i.e., the distance ratio is within the predetermined threshold range, i.e., close enough to zero (e.g., within a range of 1-0.3, 0-0.5, etc.), the system allows the display of the user interface comprising a representation of the peer data cluster for the first entity data structure, at block 412.

The distance ratio closer to one, the less difference there is between the peer data cluster group and the rest, and the less quality the peer data cluster has. As an example, this can happen for two reasons: (i) for some outcomes and departments, there are no (or too few) other hospitals that are similar to the one being analyzed; and (ii) the members of the peer group are similar to the hospital being analyzed, but so are most other hospitals. In this regard, if the system determines that the cluster quality is outside the predetermined threshold range (e.g., does not match a range of 1-0.3, 0-0.5, etc.), the system may automatically and in real-time, block the display of the user interface comprising a representation of the peer data cluster for the first entity data structure, at block 412. Here, the system may also automatically and in real-time (i), reconstruct the peer data cluster such that the peer data cluster the first entity data structure is linked with all of the remaining entity data structures in the plurality of entity data structures (in the instances where all the entities are similar), or (ii) determine that the plurality of entity data structures are not compatible with the peer data cluster for the first functional performance parameter of the first entity data structure (in the instances where there are two few entities). In some embodiments, the system may further transmit a notification to user, via the user device, comprising an indication that (i) none of the plurality of entity data structures are compatible with the peer data cluster, or (ii) a number of the plurality of entity data structures is below a minimum threshold.

Overall Quality

The system may further determine an overall quality by combining the (i) attribute quality and the (ii) cluster quality, as shown below:

Overall Quality=Attribute quality×(1−Cluster Quality)

In other words,

Overall Quality=$R$squared×(1−DistanceRatio)

As a result, the overall quality statistic is close to one for the ideal combination of a high R-squared and small distance ratio, and approaches zero when either R-squared is very small, or distance ratio is very large, indicating a low quality peer data cluster. In response to determining that the overall quality does not match a predetermined threshold range, the system reconstruct the peer data cluster, e.g., by causing the control to flow to block 410.

Additionally, technical improvements provided by the present invention, which overcomes deficiencies of conventional systems, will be discussed below with respect to FIGS. 6A-6C. FIGS. 6A-6C illustrate, an illustrative examples 600A-600C depicting the improvements provided by the invention for various hospital entity applications. FIGS. 6A-6C illustrate the varying performance of a given hospital when evaluated against three distinct peer scenarios. Specifically, each of the plots 600A-600C compare, for a given entity (e.g., teaching hospital/department) and functional performance parameter, the distribution of performance: (i) across all other entities (hospitals), (ii) among other teaching hospitals as would be obtained by conventional methods, and (iii) within that particular hospital's peer data cluster by the data transformation system 106 of the present invention.

The differences between the system 106 of the present invention's data-driven feature selection, where the peers are similar in ways that matter, and a peer data cluster scenario consisting only of teaching hospitals as would be obtained by conventional systems are illustrated. The peer data cluster constructed by the system 106 of the present invention reflects a narrower range of performance because it is based on data-driven attribute selection, in all three cases 600A-600C.

In some cases, the range of performance across only teaching hospitals as would be obtained by conventional systems, is nearly the same as the range of performance across all hospitals, as illustrated by FIG. 6B. This suggests that teaching status is not at all helpful in explaining variation in that particular performance metric and department type. The peer data cluster constructed by the system 106 of the present invention ensures that peers are similar in ways that explain performance, and results in a smaller range of performance within the peer data cluster as indicated in plot 600B.

In all plots 600A-600C the hospital falls into different quartiles depending on how it selects its peer data cluster, for a functional performance parameter of worked hours per unit (WHpU), as indicated by Table 2 below:

| | Plot Entity/Hospital | 600A First | 600B Second | 600C Third |
|---|---|---|---|---|
| | Functional Performance Parameter WHpU | 2.43 | 0.37 | 1.1 |
| All Entities WHpU | Mean | 2.76 | 0.62 | 1.16 |
| | 25th percentile | 2.06 | 0.43 | 0.99 |
| | 50th percentile | 2.56 | 0.54 | 1.14 |
| | 75th percentile | 3.32 | 0.74 | 1.28 |
| Teaching Hospitals/Conventional Method WHpU | Mean | 3.24 | 0.65 | 1.12 |
| | 25th percentile | 2.31 | 0.41 | 0.92 |
| | 50th percentile | 2.6 | 0.48 | 1.1 |
| | 75th percentile | 4.13 | 0.83 | 1.24 |
| Present invention (System 106) | Mean | 2.44 | 0.46 | 1.04 |
| | 25th percentile | 2.03 | 0.35 | 0.92 |
| | 50th percentile | 2.26 | 0.43 | 1.01 |
| | 75th percentile | 2.76 | 0.51 | 1.08 |

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for data structure clustering based on variation in data attribute performance, wherein the system is structured to link a sub-set of data structures out of a global set of data structures in a vector space to form a peer data cluster based on identifying stimulus type attributes that are structured to produce a functional performance parameter of the associated data structure, the system comprising:

at least one memory device with computer-readable program code stored thereon;

a network communication device; and at least one processor being operatively coupled to the least one memory device and the network communication device, wherein the at least one processor is configured to execute the computer-readable program code to:

retrieve a plurality of entity data structures associated with a plurality of entities, wherein retrieving the plurality of data structures comprises, for each entity data structure of the plurality of entity data structures, a first functional performance parameter and a plurality of attributes associated with an entity of the plurality of entities;

identify, for each entity data structure of the plurality of entity data structures, at least one independent attribute of the plurality of attributes that is structured to modify the first functional performance parameter associated with the entity;

construct, for each entity data structure of the plurality of entity data structures, an entity discrete attribute structure associated with an n-dimensional vector space based on the determined at least one independent attribute of the plurality of attributes;

receive, from a user device, a user input comprising a request for constructing a peer data cluster for a first entity data structure of the plurality of entity data structures for the first functional performance parameter;

construct the peer data cluster for the first functional performance parameter of the first entity data structure in response to the user input, comprising:
  determining a second entity data structure of the plurality of entity data structures that is a peer entity data structure based on an ordered stack of the plurality of entity discrete attribute structures associated with the plurality of entity data structures; and
  linking the first entity data structure and the second entity data structure to form the peer data cluster; and display, via a display device of the user device, a real-time interactive user interface comprising a representation of the peer data cluster for the first entity data structure.

2. The system for claim 1, wherein constructing the entity discrete attribute structure further comprises, for each entity data structure of the plurality of entity data structures:
  determining a weight parameter for each of the at least one independent attribute of the plurality of attributes; and
  constructing the entity discrete attribute structure such that (i) each of the at least one independent attributes triggers a vector direction of the entity discrete attribute structure in the n-dimensional vector space, and (ii) the associated weight parameter of at least one independent attribute triggers a magnitude of the entity discrete attribute structure in the associated vector direction.

3. The system for claim 1, wherein constructing the peer data cluster for the first entity data structure further comprises:
  retrieving the plurality of the entity discrete attribute structures associated with the plurality of entity data structures, wherein the plurality of the entity discrete attribute structures are associated with the n-dimensional vector space such that the number of dimensions in the n-dimensional vector space is equal to the number of the at least one independent attribute;
  determining a first entity discrete attribute structure of the plurality of entity discrete attribute structures that is associated with the first entity data structure;
  determining a spatial distance between the first entity discrete attribute and each of the plurality of the entity discrete attribute structures in the n-dimensional vector space; and
  constructing the ordered stack of the plurality of entity discrete attribute structures by arranging the plurality of the entity discrete attribute structures in an ascending order of the spatial distances.

4. The system for claim 3, wherein determining that the second entity data structure is the peer entity data structure of the first entity data structure further comprises:
  demarcating the ordered stack of the plurality of entity discrete attribute structures into (i) a peer stack comprising a first predetermined number of entity discrete attribute structures out of the plurality of entity discrete attribute structures selected in the ascending order of the spatial distances, and (ii) a non-peer stack comprising entity discrete attribute structures of the plurality of entity discrete attribute structures that are not in the peer stack;
  determining that a second entity discrete attribute structure of the plurality of entity discrete attribute structures is in the peer stack; and
  in response to determining that the second entity discrete attribute structure is in the peer stack, determining that the second entity data structure associated with the second entity discrete attribute structure is the peer entity data structure of the first entity data structure.

5. The system for claim 1, wherein linking the first entity data structure and the second entity data structure to form the peer data cluster further comprises:
  identifying a first entity discrete attribute structure of the plurality of entity discrete attribute structures that is associated with the first entity data structure; and
  linking the first entity discrete attribute structure with a second entity discrete attribute structure of the plurality of entity discrete attribute structures that is associated with the second entity data structure.

6. The system for claim 1, wherein each of the plurality of entities is a hospital, wherein the first functional performance parameter is associated with hospital performance, and wherein the plurality of attributes are associated with processes and/or patients associated with the hospital.

7. The system for claim 1, wherein the at least one processor is configured to further execute the computer-readable program code to:
  determine an attribute quality associated with the peer data cluster for the first functional performance parameter of the first entity data structure, wherein the attribute quality is associated with a variation in the first functional performance parameter caused by at least one independent attribute for each of the plurality of entity data structures; and
  trigger (i) identification of another independent attribute of the plurality of attributes different from the at least one independent attribute, and/or (ii) a reconstruction of the plurality of entity discrete attribute structures, in response to determining that the attribute quality is less than a predetermined first threshold.

8. The system for claim 1, wherein the at least one processor is configured to further execute the computer-readable program code to:
  determine a cluster quality associated with the peer data cluster for the first functional performance parameter of the first entity data structure, wherein the cluster quality is associated with a first degree of similarity between the first entity data structure and the second entity data structure in the peer data cluster, relative to a second degree of similarity between the first entity data structure and all of the plurality of entity data structures; and in response to determining that the cluster quality does not match a predetermined threshold range, reconstruct the peer data cluster such that the peer data cluster the first entity data structure is linked with all of the remaining entity data structures in the plurality of entity data structures.

9. The system for claim 1, wherein the at least one processor is configured to further execute the computer-readable program code to:

determine a cluster quality associated with the peer data cluster for the first functional performance parameter of the first entity data structure, wherein the cluster quality is associated with a first degree of similarity between the first entity data structure and the second entity data structure in the peer data cluster, relative to a second degree of similarity between the first entity data structure and all of the plurality of entity data structures; and in response to determining that the cluster quality does not match a predetermined threshold range, determine that the plurality of entity data structures are not compatible with the peer data cluster for the first functional performance parameter of the first entity data structure.

10. The system for claim 9, wherein the at least one processor is configured to further execute the computer-readable program code to: transmit a notification to user, via the user device, comprising an indication that (i) none of the plurality of entity data structures are compatible with the peer data cluster, or (ii) a number of the plurality of entity data structures is below a minimum threshold.

11. The system for claim 1, wherein the at least one processor is configured to further execute the computer-readable program code to:

determine an overall quality associated with the peer data cluster for the first functional performance parameter of the first entity data structure, wherein the overall quality is a combination of an attribute quality and a cluster quality, wherein the attribute quality is associated with a variation in the first functional performance parameter caused by at least one independent attribute for each of the plurality of entity data structures, wherein the cluster quality is associated with a first degree of similarity between the first entity data structure and the second entity data structure in the peer data cluster, relative to a second degree of similarity between the first entity data structure and all of the plurality of entity data structures; and in response to determining that the overall quality does not match a predetermined threshold range, reconstruct the peer data cluster.

12. A computer program product for data structure clustering based on variation in data attribute performance, wherein the computer program product is structured to link a sub-set of data structures out of a global set of data structures in a vector space to form a peer data cluster based on identifying stimulus type attributes that are structured to produce a functional performance parameter of the associated data structure, the computer program product comprising a non-transitory computer-readable storage medium having computer-executable instructions to:

retrieve a plurality of entity data structures associated with a plurality of entities, wherein retrieving the plurality of data structures comprises, for each entity data structure of the plurality of entity data structures, a first functional performance parameter and a plurality of attributes associated with an entity of the plurality of entities;

identify, for each entity data structure of the plurality of entity data structures, at least one independent attribute of the plurality of attributes that is structured to modify the first functional performance parameter associated with the entity;

construct, for each entity data structure of the plurality of entity data structures, an entity discrete attribute structure associated with an n-dimensional vector space based on the determined at least one independent attribute of the plurality of attributes;

receive, from a user device, a user input comprising a request for constructing a peer data cluster for a first entity data structure of the plurality of entity data structures for the first functional performance parameter;

construct the peer data cluster for the first functional performance parameter of the first entity data structure in response to the user input, comprising:

determining a second entity data structure of the plurality of entity data structures that is a peer entity data structure based on an ordered stack of the plurality of entity discrete attribute structures associated with the plurality of entity data structures; and linking the first entity data structure and the second entity data structure to form the peer data cluster; and display, via a display device of the user device, a real-time interactive user interface comprising a representation of the peer data cluster for the first entity data structure.

13. The computer program product of claim 12, wherein constructing the entity discrete attribute structure further comprises, for each entity data structure of the plurality of entity data structures:

determining a weight parameter for each of the at least one independent attribute of the plurality of attributes; and constructing the entity discrete attribute structure such that (i) each of the at least one independent attributes triggers a vector direction of the entity discrete attribute structure in the n-dimensional vector space, and (ii) the associated weight parameter of at least one independent attribute triggers a magnitude of the entity discrete attribute structure in the associated vector direction.

14. The computer program product of claim 12, wherein constructing the peer data cluster for the first entity data structure further comprises:

retrieving the plurality of the entity discrete attribute structures associated with the plurality of entity data structures, wherein the plurality of the entity discrete attribute structures are associated with the n-dimensional vector space such that the number of dimensions in the n-dimensional vector space is equal to the number of the at least one independent attribute;

determining a first entity discrete attribute structure of the plurality of entity discrete attribute structures that is associated with the first entity data structure;

determining a spatial distance between the first entity discrete attribute and each of the plurality of the entity discrete attribute structures in the n-dimensional vector space; and constructing the ordered stack of the plurality of entity discrete attribute structures by arranging the plurality of the entity discrete attribute structures in an ascending order of the spatial distances.

15. The computer program product of claim 14, wherein determining that the second entity data structure is the peer entity data structure of the first entity data structure further comprises:
- demarcating the ordered stack of the plurality of entity discrete attribute structures into (i) a peer stack comprising a first predetermined number of entity discrete attribute structures out of the plurality of entity discrete attribute structures selected in the ascending order of the spatial distances, and (ii) a non-peer stack comprising entity discrete attribute structures of the plurality of entity discrete attribute structures that are not in the peer stack;
- determining that a second entity discrete attribute structure of the plurality of entity discrete attribute structures is in the peer stack; and
- in response to determining that the second entity discrete attribute structure is in the peer stack, determining that the second entity data structure associated with the second entity discrete attribute structure is the peer entity data structure of the first entity data structure.

16. The computer program product of claim 12, wherein the non-transitory computer-readable storage medium further has computer-executable instructions to:
- determine an overall quality associated with the peer data cluster for the first functional performance parameter of the first entity data structure, wherein the overall quality is a combination of an attribute quality and a cluster quality, wherein the attribute quality is associated with a variation in the first functional performance parameter caused by at least one independent attribute for each of the plurality of entity data structures, wherein the cluster quality is associated with a first degree of similarity between the first entity data structure and the second entity data structure in the peer data cluster, relative to a second degree of similarity between the first entity data structure and all of the plurality of entity data structures; and
- in response to determining that the overall quality does not match a predetermined threshold range, reconstruct the peer data cluster.

17. A computerized method for data structure clustering based on variation in data attribute performance, wherein the method is structured to link a sub-set of data structures out of a global set of data structures in a vector space to form a peer data cluster based on identifying stimulus type attributes that are structured to produce a functional performance parameter of the associated data structure, the computerized method comprising:
- retrieving a plurality of entity data structures associated with a plurality of entities, wherein retrieving the plurality of data structures comprises, for each entity data structure of the plurality of entity data structures, a first functional performance parameter and a plurality of attributes associated with an entity of the plurality of entities;
- identifying, for each entity data structure of the plurality of entity data structures, at least one independent attribute of the plurality of attributes that is structured to modify the first functional performance parameter associated with the entity;
- constructing, for each entity data structure of the plurality of entity data structures, an entity discrete attribute structure associated with an n-dimensional vector space based on the determined at least one independent attribute of the plurality of attributes;
- receiving, from a user device, a user input comprising a request for constructing a peer data cluster for a first entity data structure of the plurality of entity data structures for the first functional performance parameter;
- constructing the peer data cluster for the first functional performance parameter of the first entity data structure in response to the user input, comprising:
  - determining a second entity data structure of the plurality of entity data structures that is a peer entity data structure based on an ordered stack of the plurality of entity discrete attribute structures associated with the plurality of entity data structures; and
  - linking the first entity data structure and the second entity data structure to form the peer data cluster; and
- displaying, via a display device of the user device, a real-time interactive user interface comprising a representation of the peer data cluster for the first entity data structure.

18. The computerized method of claim 17, wherein constructing the entity discrete attribute structure further comprises, for each entity data structure of the plurality of entity data structures:
- determining a weight parameter for each of the at least one independent attribute of the plurality of attributes; and
- constructing the entity discrete attribute structure such that (i) each of the at least one independent attributes triggers a vector direction of the entity discrete attribute structure in the n-dimensional vector space, and (ii) the associated weight parameter of at least one independent attribute triggers a magnitude of the entity discrete attribute structure in the associated vector direction.

19. The computerized method of claim 17, wherein constructing the peer data cluster for the first entity data structure further comprises:
- retrieving the plurality of the entity discrete attribute structures associated with the plurality of entity data structures, wherein the plurality of the entity discrete attribute structures are associated with the n-dimensional vector space such that the number of dimensions in the n-dimensional vector space is equal to the number of the at least one independent attribute; determining a first entity discrete attribute structure of the plurality of entity discrete attribute structures that is associated with the first entity data structure;
- determining a spatial distance between the first entity discrete attribute and each of the plurality of the entity discrete attribute structures in the n-dimensional vector space; and
- constructing the ordered stack of the plurality of entity discrete attribute structures by arranging the plurality of the entity discrete attribute structures in an ascending order of the spatial distances.

20. The computerized method of claim 17, wherein the method further comprises:
- determining an overall quality associated with the peer data cluster for the first functional performance parameter of the first entity data structure, wherein the overall quality is a combination of an attribute quality and a cluster quality, wherein the attribute quality is associated with a variation in the first functional performance parameter caused by at least one independent attribute for each of the plurality of entity data structures, wherein the cluster quality is associated with a first degree of similarity between the first entity data structure and the second entity data structure in the peer data cluster, relative to a second degree of similarity between the first entity data structure and all of the plurality of entity data structures; and in response to determining that the overall quality does not match a predetermined threshold range, reconstructing the peer data cluster.

21. A system for data structure clustering based on variation in data attribute performance, wherein the system is structured to link a sub-set of data structures out of a global set of data structures in a vector space to form a peer data cluster based on identifying stimulus type attributes that are structured to produce a functional performance parameter of the associated data structure, the system comprising:

at least one memory device with computer-readable program code stored thereon;

a network communication device; and at least one processor being operatively coupled to the least one memory device and the network communication device, wherein the at least one processor is configured to execute the computer-readable program code to:

retrieve a plurality of entity data structures associated with a plurality of entities, wherein retrieving the plurality of data structures comprises, for each entity data structure of the plurality of entity data structures, a first functional performance parameter and a plurality of attributes associated with an entity of the plurality of entities;

identify, for each entity data structure of the plurality of entity data structures, at least one independent attribute of the plurality of attributes that is structured to modify the first functional performance parameter associated with the entity;

construct, for each entity data structure of the plurality of entity data structures, an entity discrete attribute structure associated with an n-dimensional vector space based on the determined at least one independent attribute of the plurality of attributes;

receive, from a user device, a user input comprising a request for constructing a peer data cluster for a first entity data structure of the plurality of entity data structures for the first functional performance parameter;

construct the peer data cluster for the first functional performance parameter of the first entity data structure in response to the user input, comprising:

determining a second entity data structure of the plurality of entity data structures that is a peer entity data structure based on an ordered stack of the plurality of entity discrete attribute structures associated with the plurality of entity data structures; and linking the first entity data structure and the second entity data structure to form the peer data cluster;

determine at least one of an attribute quality and/or a cluster quality associated with the peer data cluster for the first functional performance parameter of the first entity data structure; and display, via a display device of the user device, a real-time interactive user interface comprising a representation of the peer data cluster for the first entity data structure.

22. The system for claim 21, wherein the at least one processor is configured to further execute the computer-readable program code to:

determine an attribute quality associated with the peer data cluster for the first functional performance parameter of the first entity data structure, wherein the attribute quality is associated with a variation in the first functional performance parameter caused by at least one independent attribute for each of the plurality of entity data structures; and trigger (i) identification of another independent attribute of the plurality of attributes different from the at least one independent attribute, and/or (ii) a reconstruction of the plurality of entity discrete attribute structures, in response to determining that the attribute quality is less than a predetermined first threshold.

23. The system for claim 21, wherein the at least one processor is configured to further execute the computer-readable program code to:

determine a cluster quality associated with the peer data cluster for the first functional performance parameter of the first entity data structure, wherein the cluster quality is associated with a first degree of similarity between the first entity data structure and the second entity data structure in the peer data cluster, relative to a second degree of similarity between the first entity data structure and all of the plurality of entity data structures; and in response to determining that the cluster quality does not match a predetermined threshold range, reconstruct the peer data cluster such that the peer data cluster the first entity data structure is linked with all of the remaining entity data structures in the plurality of entity data structures.

24. The system for claim 21, wherein the at least one processor is configured to further execute the computer-readable program code to:

determine a cluster quality associated with the peer data cluster for the first functional performance parameter of the first entity data structure, wherein the cluster quality is associated with a first degree of similarity between the first entity data structure and the second entity data structure in the peer data cluster, relative to a second degree of similarity between the first entity data structure and all of the plurality of entity data structures; and in response to determining that the cluster quality does not match a predetermined threshold range, determine that the plurality of entity data structures are not compatible with the peer data cluster for the first functional performance parameter of the first entity data structure.

25. The system for claim 24, wherein the at least one processor is configured to further execute the computer-readable program code to: transmit a notification to user, via the user device, comprising an indication that (i) none of the plurality of entity data structures are compatible with the peer data cluster, or (ii) a number of the plurality of entity data structures is below a minimum threshold.

26. The system for claim 21, wherein the at least one processor is configured to further execute the computer-readable program code to:

determine an overall quality associated with the peer data cluster for the first functional performance parameter of the first entity data structure, wherein the overall quality is a combination of an attribute quality and a cluster quality, wherein the attribute quality is associated with a variation in the first functional performance parameter caused by at least one independent attribute for each of the plurality of entity data structures, wherein the cluster quality is associated with a first degree of similarity between the first entity data structure and the second entity data structure in the peer data cluster, relative to a second degree of similarity between the first entity data structure and all of the plurality of entity data structures; and in response to determining that the overall quality does not match a predetermined threshold range, reconstruct the peer data cluster.

* * * * *